Figure 9:
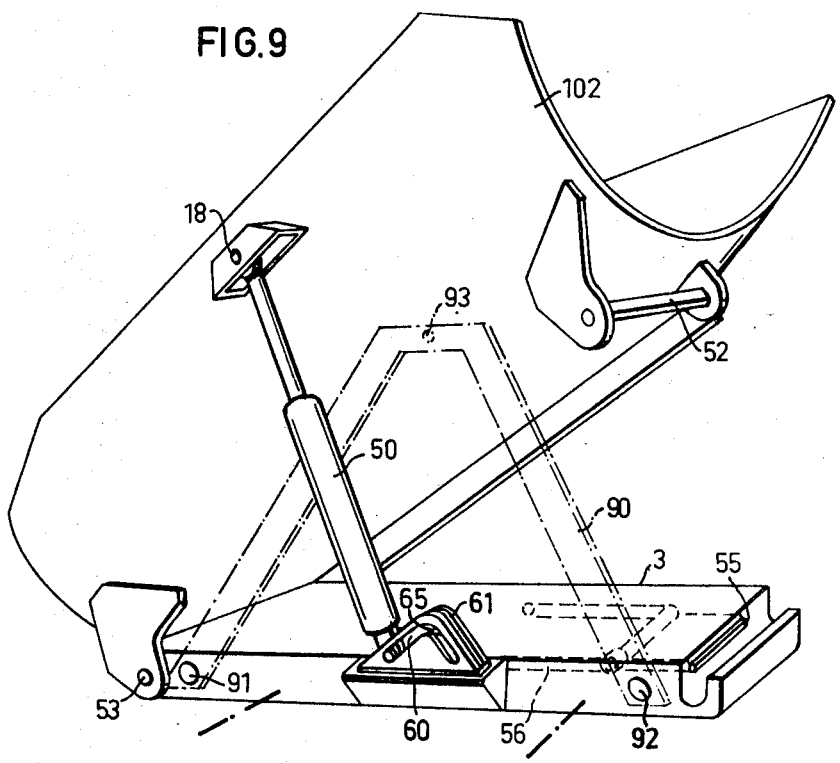

United States Patent

[11] 3,599,819

| [72] | Inventor | Tage Nils Wilhelm Leijon |
| | | Sturevagen 18, Stocksund, Sweden |
| [21] | Appl. No. | 790,391 |
| [22] | Filed | Jan. 10, 1969 |
| [45] | Patented | Aug. 17, 1971 |
| [32] | Priority | Feb. 28, 1969 |
| [33] | | Sweden |
| [31] | | 2,566/1968 |

[54] TRACTOR VEHICLE IMPLEMENT HOLDER FOR INTERCHANGEABLE MOUNTING OF IMPLEMENTS
1 Claim, 16 Drawing Figs.

| [52] | U.S. Cl. | 214/768, 298/17.6 |
| [51] | Int. Cl. | E02f 3/70 |
| [50] | Field of Search | 214/768, 140 SD; 298/17.6 |

[56] References Cited
UNITED STATES PATENTS

| 2,821,313 | 1/1958 | Warner | 214/768 |
| 3,022,910 | 2/1962 | Anderson | 214/768 |
| 3,203,565 | 8/1965 | Keskitalo | 214/768 |
| 3,312,364 | 4/1967 | Granryd | 214/768 |
| 2,072,998 | 3/1937 | Allin | 298/17.6 |
| 3,198,358 | 8/1965 | Gardner | 214/145 X |

FOREIGN PATENTS

| 640,180 | 3/1963 | Sweden | 37/118 (A) |

*Primary Examiner*—Albert J. Makay
*Attorney*—Pierce, Scheffler & Parker

ABSTRACT: A tractor vehicle implement holder is adapted for interchangeable mounting of working implements which may have fixed or movable relationship to the holder.

The implement comprises, for example, a front dump bucket, a front and side dump bucket, or a lumber fork lift. The holder comprises a drive means such as a hydraulic jack for pivoting such interchangeable implement which is movable relative to the holder. The drive means is operatively connected to a locking means so as to turn or displace it between its locking and releasing positions.

The locking means is either a part of a turnable pivot shaft for the implement, said pivot shaft being positioned on the holder, or a displaceable locking element, in the locking position engaging a pivot shaft attached to the implement.

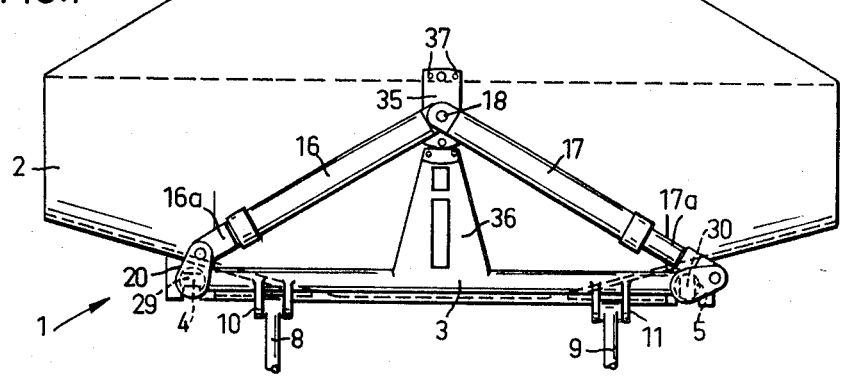
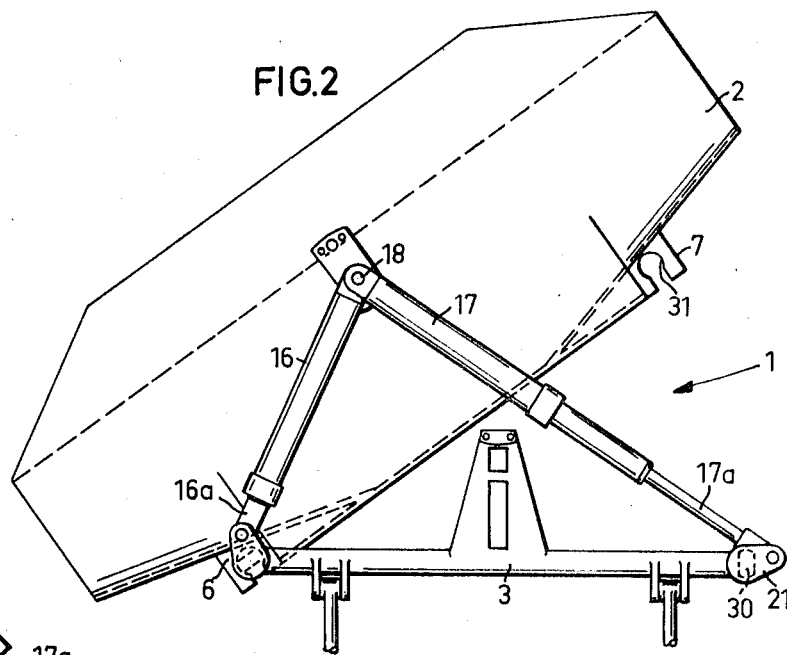
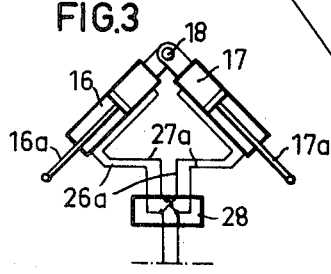
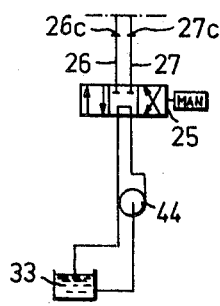

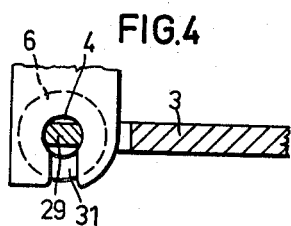
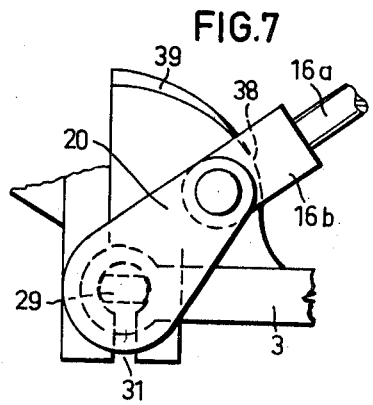
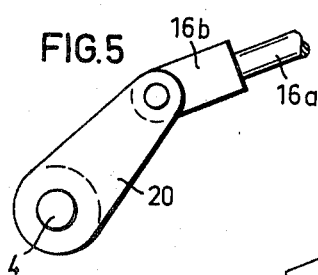
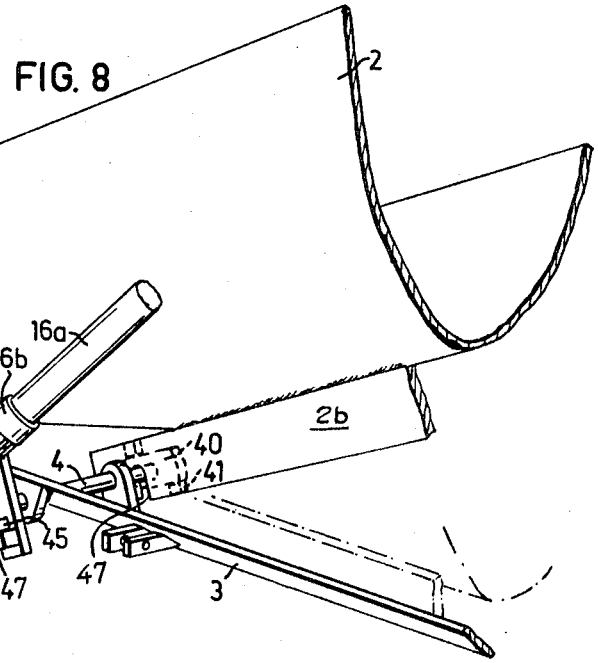
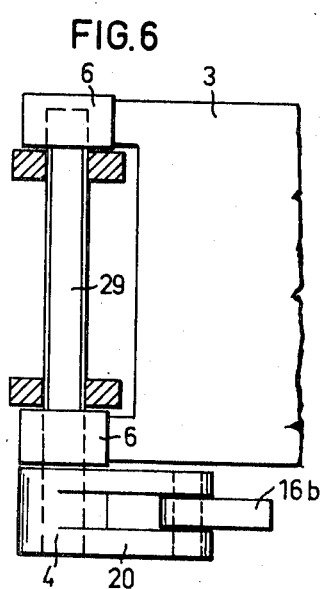

PATENTED AUG 17 1971 3,599,819

SHEET 3 OF 4

INVENTOR.
Tage Nils Wilhelm Leijon
BY
Pierce, Schiffler & Parker
attorneys

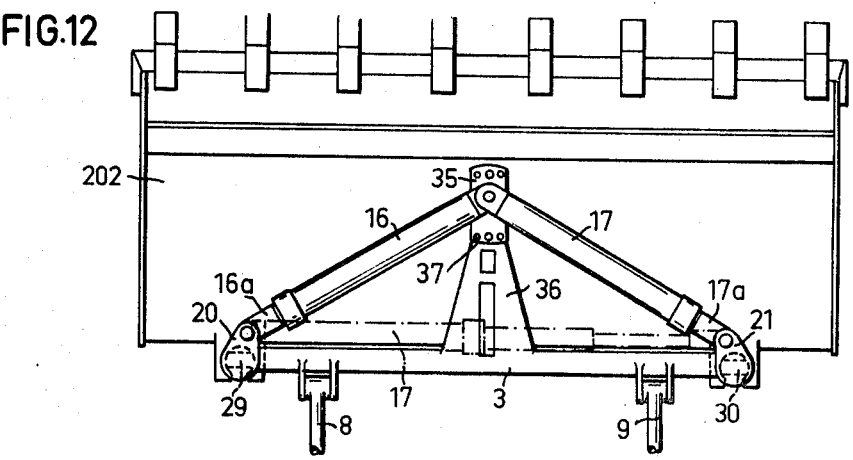
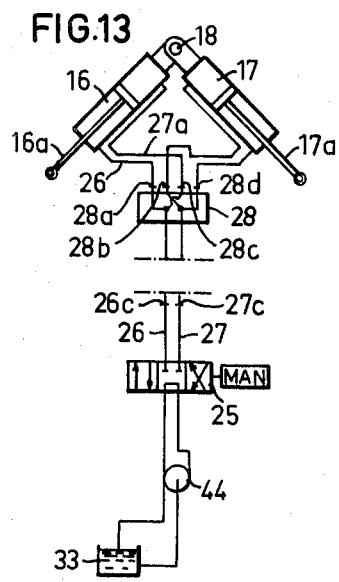
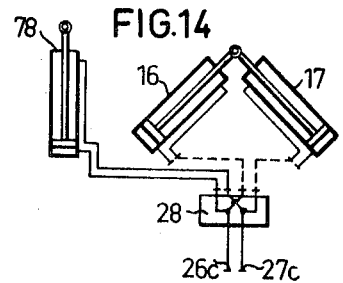
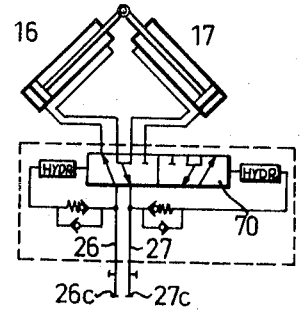
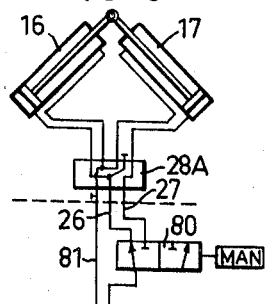

TRACTOR VEHICLE IMPLEMENT HOLDER FOR INTERCHANGEABLE MOUNTING OF IMPLEMENTS

The present invention relates to an implement holder for tractors and similar vehicles to which holder different kinds of implements can be fitted.

An object of the invention is to provide a tractor vehicle implement holder which permits a simple and efficient mounting of the implement on the holder and which, moreover, is designed to permit swinging movements of certain implements relative to the holder to be carried out in a simple way with a minimum of connections to the hydraulic system of the tractor.

A special object of the invention is to provide a universal implement holder for a tractor which by simple changeovers can be used for interchangeable mounting of different kinds of implements or tools, e.g. one-, two-, or three-way dumping buckets of different sizes and designs, or lumber fork lifts etc. whereby, in addition to a reliable locking of the implement to the holder, a simple release of a locking device is possible when so required so that the implement can perform swinging movements actuated by one or more hydraulic jacks connected to said holder and with due consideration to the simplest possible arrangement for the connection of said one or more hydraulic jacks to the operating controls of the tractor vehicle.

Said objects and a number of other ones are provided by the invention as defined in the accompanying claims.

The hydraulic jack or jacks constituting the drive means thus will perform different tasks depending upon the type of implement being mounted, whereby in any case a locking of the implement to the holder can always be effectuated by at least one hydraulic jack, if so desired.

Figure 10:
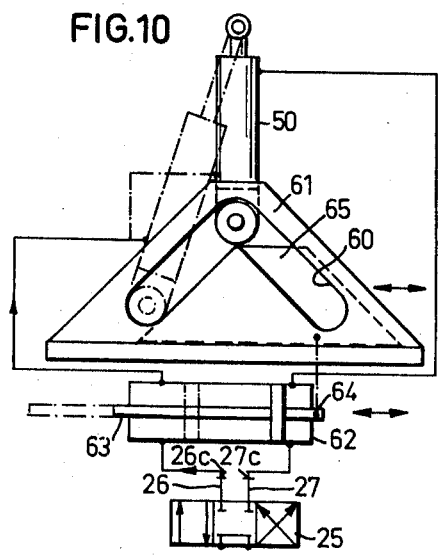
Figure 11:
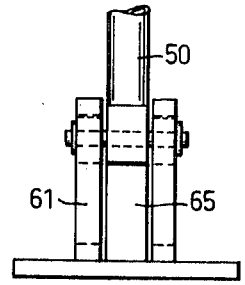

Additional characteristics and advantages of the invention will be evident from the following description of a number of preferred embodiments of the same with reference to the accompanying drawings, in which:

FIG. 1 is a rear view showing a universal implement holder according to the invention, which holder is pivotable about a transverse horizontal axis for forward dumping of an implement attached thereto and equipped with an excavator bucket adapted for side dumping in two directions relative to the holder, FIG. 2 is a rear view showing the universal implement holder according to FIG. 1 with the excavator bucket swung into a side dumping position, FIG. 3 is a schematic view of a preferred hydraulic system for the holder illustrated in FIGS. 1 and 2, FIGS. 4—6 illustrate details of a locking mechanism used on the bearing or pivot shafts in the embodiments according to FIGS. 1 and 2, FIG. 7 shows a modified embodiment thereof, FIGS. 8 and 9 are perspective views of additional embodiments of the implement holder in which three-way dumping excavator buckets are mounted, FIGS. 10 and 11 illustrate details of FIG. 9, FIG. 12 shows the implement holder according to FIGS. 1 and 2 whereby the side dumping excavator bucket has been substituted by an excavator buckets of conventional design for forward dumping only, FIG. 13 shows the hydraulic system schematically illustrated in FIG. 3 with the necessary changes undertaken in the coupling to suit the needs of the implement illustrated in FIG. 12.

FIGS. 14—16 illustrate modifications of the coupling of the hydraulic installation according to FIG. 13 to be used when the holder carries different types of implements.

In the Figures, 3 indicated a universal implement holder which in the embodiment illustrated in FIGS. 1 and 2 carries an excavator bucket 2 which is open at both ends, forming an excavator assembly 1 designed for three-way dumping. The excavated material can be discharged laterally in each direction, the bucket being pivoted about two pivot or bearing shafts 4 and 5 respectively, cooperating with bearing claws 6 and 7 respectively, located at the underside of the bucket. The holder is mounted on a tractor or power excavator, not shown, by means of arms 8,9, and still further arms, not shown. The holder can thereby pivot about transverse horizontal shafts 10,11 for forward dumping of the implement carried on the same.

For side dumping of the implement and for its locking in the central digging position two hydraulic jacks 16, 17 are used. In the embodiment according to FIGS. 1 and 2, said jacks engage central shaft 18 of the bucket. Further piston 16a of hydraulic jack 16 is via lever 20 connected with pivot or bearing shaft 4 while piston 17a of hydraulic jack 17 via lever 21 is connected with pivot or bearing shaft 5 of the bucket. Rigidly attached to bearing shafts 4 and 5 respectively are locking means which engage suitably shaped elements located at the underside of the implement in order to lock said implement to the holder. In the embodiment according to FIGS. 1 and 2 the locking means comprise not round, planar portions 29 and 30 respectively of bearing shafts 4 and 5 respectively. In vertical position said planar portions fit into keyhole-shaped openings 31 in bearing claws 6 and 7 respectively. When bearing shafts 4,5 pivot, the means will occupy the locking position keeping the implement assembly together, impeding a relative pivotal movement between the holder and the implement.

The schematic illustration in FIG. 3 of the hydraulic installation shows how the symmetrically arranged hydraulic jacks 16,17 cooperate with the holder, the implement and the locking means of bearing shafts 4 and 5, the last-mentioned locking means not being shown in FIG. 3. It is evident from said schematic illustration that hydraulic jacks 16 and 17 are cross-coupled which means that a force urging the piston of one hydraulic jack to extend simultaneously keeps the piston of the other jack in retracted position.

OPerating valve 25, which is the so-called third valve of the tractor vehicle, has a zero position in which hydraulic liquid from tank 33 previously supplied by means of pump 44 is returned to said tank, and two operating positions. In one of the operating positions hydraulic liquid is supplied through left conduct 26 with branch conduct 26c leading to the cross-coupled hydraulic jacks 16,17 whereby right conduct 27 with branch conduct 27c serves for the return flow while in the other operating position of the valve the flow in the lines is reversed. Crosscoupling of the hydraulic jacks is accomplished in distribution block 28 in which line 26 branches out in two lines 26a while line 27 branches out in the two lines 27a.

Each one of hydraulic jacks 16,17 cooperates with pivot or bearing shaft 4 and 5 respectively by means of lever arms 20 or 21 in such a manner that in certain positions the weight of the implement can be utilized when operating the locking means.

When from the central position shown in FIG. 1 the implement shall be pivoted to the position illustrated in FIG. 2 a force is applied through line 27 urging the piston of hydraulic jack 17 at right to extend. At the same time the piston of hydraulic jack 16 at the left is kept in retracted position. The movement of the piston of right-hand hydraulic jack results primarily in lever arm 21 turning shaft 5 and so that the locking element 30 takes the vertical position illustrated in FIG. 1 in which there is no longer any locking of bearing claw 7. A stop on the holder or on the piston rod 17a impedes further turning movement of locking means 30, and therefore by continued movement of the hydraulic piston the implement instead will be pivoted into the position illustrated in Fig. 2. At the same time hydraulic jack 16 maintains its position relative to the implement following the pivoting movement of the said implement. Bearing shaft 4 to the left also keeps its position relative to the implement and turns in relation to the holder, thereby securing locking.

For the return pivoting movement of the implement pressure is applied in line 26. By the weight of the implement resting on the extended hydraulic jack 17 to the right a distribution of forces is created to the effect that said jack will retract without pivoting of right lever 21 and without extension of left hydraulic jack 16 until the implement occupies its position for getting locked in the holder, whereby a further retraction of hydraulic jack 17 will result in lever 21 and bearing shaft 5 being pivoted so that locking means 30 occupies its locking position. A continued pressure in line 26 thereafter results in the extension of the hydraulic jack 16, which in its turn frees the left locking element and results in swinging of the bucket, the pivoting movement now taking place in the opposite direction about shaft 5.

Thus, with one single application of pressure in one of lines 26 and 27 downward pivoting of the implement from raised position is obtained, one of the locking elements thereby being maintained in the releasing position, and the other one in locking position and moreover, pivoting about one of the locking means after the implement has reached locking position and further, under continued pressure application release of the other locking element is obtained as well as pivoting of the implement into raised position about the earlier released but now locked pivot shaft.

When the implement has reached halfway position a reverse movement can be arranged if so desired, i.e. the downward movement is interrupted and a renewal of the upward pivoting movement takes place about the same pivot shaft which served as axis for the downwards tilting movement, this being achieved by applying pressure in the other one of the hydraulic conduits.

Thus, for selective tilting of the implement with release of the corresponding locking means as well as return movement and locking in the central position and renewal of selective tilting only two operating conduits 26,27 are required which are connected to the third valve of the tractor or power excavator at 26c,27c. At the same time a reliable, strong assembly of holder and implement is secured in the central position.

A few types of locking means are illustrated in FIGS. 4—9. In FIGS. 4—6 the locking means employed in the embodiments according to FIGS. 1 and 2 are shown on an enlarged scale. According to FIG. 4 bearing claw 6 is provided with a keyhole-shaped shaped opening 31 cooperating with locking member 29 planing bearing shaft 4. In FIG. 5 lever arm 20 is illustrated which, actuated by piston 16a of the hydraulic jack to the left, pivots bearing shaft 4 between the release and locking positions. FIG. 6 is a cross-sectional view of the arrangement. In FIG. 7 it is shown how the locking device illustrated in FIGS. 4—6 can be provided with an additional complementary mechanical stop 38 shaped like a shoulder on piston head 16b of piston rod 16a, which shoulder cooperates with cam 39 of the holder whereby pivoting of lever 20 for release of the locking is made impossible in all positions except the one where the implement occupies the central position.

In FIG. 8 a perspective view is shown of part of a modified universal implement holder with the implement of the side dumping excavator bucket type, the locking means being designed to the effect that it is possible to initiate the locking operation of the implement already before the implement has arrived at its ultimate locking position. In this embodiment piston rod 16a, as is the case in all the other embodiments, is operatively connected to bearing shaft 4 to the left via lever 20. The locking means comprise pins 40 projecting at right angle to shaft 4, which pins cooperate with shoulders 41 on plates 2b attached to the underside of the implement. Plates 2b are further provided with U-shaped cuts 47 for shaft 4, i.e. any keyhole-shaped openings for the bearing shafts are not required, and the implement can be tilted down to the holder. Locking pins 40, when they are turned around, urge the implement in a downward direction pressing it against the holder, i.e. the locking operation of implement and holder can take place even if the implement from the beginning should not have arrived in correct position for locking. A stop lug 45 attached to lever 20 and which cooperates with cut 46 in the head of the piston rod impedes pivoting of shaft 4 past the correct opening position in which the implement is released for tilting around the opposite pivot axis.

In the embodiment illustrated in FIGS. 9—11 holder 3 carries a three-way dumping bucket 102. A hydraulic jack 50 provides the force for tilting the implement in any one of the side tilting directions, and in the particular embodiment mentioned said unit is equipped with longitudinally movable locking elements which keep implement and holder together, respectively permit selective release of said implement. In the embodiment mentioned the implement itself is equipped with pivot shafts 52,53. Locking elements of which only the right one, indicated by 55, is visible in FIG. 9 are by means of links 56 connected to hydraulic jack 50 and depending upon the movement of the latter one said locking elements are movable in linear direction between a releasing position and a locking position where the bearing shafts 52 and 53, respectively, are covered.

Hydraulic jack 50 supplying the force, the piston rod of which engages the implement, is at its other end carried between two blocks 61 provided with slots 6 of inverted V-shape. A hydraulic control unit 62 with piston rods 63,64 projecting laterally actuates blocking element 65 which can move between the blocks so that by supplying hydraulic liquid to one or the other side of said hydraulic unit 62, one leg or the other of the inverted V-shaped slot can be blocked depending upon the desired tilting direction. Thus, in FIG. 10 the right side of the inverted V-slot is blocked whereby the hydraulic liquid supplied from controlling unit 62 to hydraulic jack 50, its piston just beginning to extend, will bring about that the lower end of said jack 50 will move downwardly into the left leg of the inverted V-slot. Locking mechanism 55 to the right will thereby release right bearing shaft 52 so that the implement will tilt upwards to the left into the position illustrated in FIG. 9. Thus the implement holder just described functions substantially in the same manner as the first one described where two hydraulic jacks connected in series were used, of which only one is used for the tilting operation while the other one is a controlling unit for selection of the desired tilting direction. In FIG. 9 a detachable holder part 90 is indicated by broken lines, which part by means of bolts 91,92 can be attached to holder part 3. When the holder shall be used for a type of implement, which is not pivotable sideways, part 90 can be attached to the same and force supplying hydraulic jack 50 be connected to it at 93, whereby the hydraulic jack only actuates locking elements 55.

In FIG. 12 the same implement holder is employed as in FIGS. 1 and 2. However, a conventional type of excavator bucket 202 for front dumping only has been placed in the implement holder according to FIG. 12. In FIG. 13 a schematic view of the hydraulic installation to be used in the embodiment according to FIG. 12 is shown. As is evident, both hydraulic jacks 16 and 17 are coupled in parallel which means that both simultaneously will release and lock the locking mechanism. Other simple modifications of the design of the implement holder, which have to be made, are evident from a comparison between FIGS. 1 and 12. According to FIG. 1 cylinders 16 and 17 are fixed to a common plate 35 which according to FIG. 1 by means of bolt 35 is fixed directly on the rear side of the implement. When the implement holder shall be used for excavator bucket 202 respectively for quick change between different implements, plate 35 is fixed to holder 3. For said purpose the holder is provided with a specially designed part 36. By removing both bolts 37, turning around the plate and by means of the same bolts fixing the plate onto part 36 of the holder, the desired change has been performed.

Instead of the forward dumping bucket 202 other implements can be attached to the holder in the corresponding manner. Thereby, according to desire, only one of the hydraulic jacks may be used to actuate the two locking elements 29,30 while the other unit may be removed or be utilized for other purpose.

In FIG. 13 the installation of the hydraulic jacks 16 and 17 employed in the embodiment according to FIG. 12 is schematically illustrated. It is evident that, compared to the diagram shown in FIG. 3, the coupling of the jacks is not identical as instead of crosscoupling according to FIG. 3 the jacks are coupled in parallel according to FIG. 13. The switch to another type of coupling has been done by means of a quick change valve assembly 28a—28d in block 28.

In FIGS. 15 and 16 certain modifications of the hydraulic diagram of FIGS. 3, 13 and 14 are shown. The figures also illustrate that the hydraulic jacks can be arranged for movement of the piston rod in opposite directions without any principal change taking place.

FIG. 15 illustrates a pressure controlled reversing valve 70 for control of hydraulic jacks 16 and 17. As can be seen from the figure the connections to both piston rod sides of said jacks have been coupled together while the reverse is taking place between the piston sides of the hydraulic jacks.

In FIG. 16 is a similar principle of recoupling is shown but the reversing valve 80 employed in this construction is served manually and is located in the vehicle part of the tractor and implement assembly. Thus, in this particular design certain extra equipment is required which is not necessary in the application of the other hydraulic systems exemplified.

The hydraulic principle diagram shown in FIG. 16 admits further possibilities of variations of the design of the implement holder. With the three conduits 26,27,81 three hydraulic units can be operated simultaneously. Further, the implement holder in this case may be employed for alternative use of for example a side dumping excavator bucket and other implements without the driver necessarily having to abandon the tractor.

In the alternative embodiment indicated in FIG. 12 by broken lines one of the hydraulic units, e.g. the one indicated by 17, via lever arm 21 may actuate locking element 30 whereby the other end of the unit is connected to element 36 of the holder. Left locking element 29 in such a case can be actuated via a rigid bar (not shown) or similar by lever arm 21 of right locking element 30. Left hydraulic jack 16 can thereby be removed or be given other duties.

As is evident the implement holder according to the invention has a great many possibilities of use and therefore meets the requirements as to a universal implement holder for tractors.

I claim:

1. A tractor vehicle implement holder for mounting implements having sideways pivotable relationship to the holder at two laterally spaced pivot axes, said holder comprising drive means for pivoting said implement relative to said holder and means for selectively releasably locking said implement to said holder at at least one of said pivot axes, said drive means being operatively connected to said selectively releasable locking means, said drive means including one hydraulic jack, a lost motion device in which said jack operates, a hydraulic drive for moving said lost motion device sideways to operate said releasable locking means in accordance with the angle of the lost motion device to the geometric axis of the jack, said lost motion device including two guide slots at an angle to each other, said hydraulic jack being movable therein and blocking means for blocking one of said guide slots to prevent said hydraulic jack from entering said blocked slot.